(12) United States Patent
Sakajian

(10) Patent No.: US 9,738,464 B1
(45) Date of Patent: Aug. 22, 2017

(54) SYSTEM AND METHOD FOR PROTECTING CONTAINERS FROM DAMAGE DURING LOADING

(71) Applicant: Scott Sakajian, Valencia, CA (US)

(72) Inventor: Scott Sakajian, Valencia, CA (US)

( * ) Notice: Subject to any disclaimer, the term of this patent is extended or adjusted under 35 U.S.C. 154(b) by 0 days.

(21) Appl. No.: 14/834,970

(22) Filed: Aug. 25, 2015

Related U.S. Application Data

(63) Continuation-in-part of application No. 14/058,029, filed on Oct. 18, 2013, now abandoned.

(60) Provisional application No. 62/152,148, filed on Apr. 24, 2015, provisional application No. 61/715,771, filed on Oct. 18, 2012.

(51) Int. Cl.
  *B65G 65/32* (2006.01)
  *B65D 88/26* (2006.01)
  *B65D 88/54* (2006.01)

(52) U.S. Cl.
  CPC .............. *B65G 65/32* (2013.01); *B65D 88/26* (2013.01); *B65D 88/54* (2013.01)

(58) Field of Classification Search
  CPC ................................. B30B 9/3042; B65F 9/00
  USPC .......................................... 414/328, 288, 397
  See application file for complete search history.

(56) References Cited

U.S. PATENT DOCUMENTS

| | | |
|---|---|---|
| 3,040,914 A | 6/1962 | Johnson, et al. |
| 3,175,708 A | 3/1965 | Felts |
| 3,186,568 A | 6/1965 | Spinager et al. |
| 3,220,586 A | 11/1965 | Gollnick |
| 3,252,602 A | 5/1966 | Bowles |
| 3,727,777 A | 4/1973 | Hanson |
| 3,780,893 A | 12/1973 | Lassig et al. |
| 3,815,764 A | 6/1974 | Gilfillan et al. |
| 3,857,501 A | 12/1974 | Lassig et al. |
| 3,938,678 A | 2/1976 | Kern |
| 3,952,887 A | 4/1976 | Lutz |

(Continued)

FOREIGN PATENT DOCUMENTS

| | | |
|---|---|---|
| EP | 0634348 A1 | 1/1995 |
| JP | 2004149138 A | 5/2004 |

(Continued)

*Primary Examiner* — Kaitlin Joerger
(74) *Attorney, Agent, or Firm* — David L. Hoffman; Hoffman Patent Group

(57) ABSTRACT

In order to protect the side walls of a container during loading, in one design, a hopper has one or more barrier wall pairs attached to the hopper walls at the end adjacent to a container. As the hopper is moved forward the barrier walls of the barrier wall pair become closely adjacent to the walls of the container protecting them from damage and helping enable material to be pushed into the container. In a variation, an assembly of barrier wall pairs is set inside a hopper and material is deposited between the barrier walls of the barrier wall pair and then the assembly is moved forward into the container, the material being pushed along with the barrier wall pair into the container. In another variation, the barrier walls may be hinged to the hopper walls. More than one barrier wall pair can be used. Where there are two pairs, the second pair can be hinged to the first so that the second pair can be extended or rotated into a storage position. In a further variation, barrier walls on opposite sides of the hopper are of different length and/or barrier wall pairs are of unequal length.

21 Claims, 12 Drawing Sheets

(56) References Cited

U.S. PATENT DOCUMENTS

| | | | |
|---|---|---|---|
| 4,133,438 A | | 1/1979 | Liberman et al. |
| 4,260,317 A | * | 4/1981 | Martin .................. B60P 1/006 |
| | | | 280/656 |
| 4,264,213 A | * | 4/1981 | Dillman .................. B01F 5/24 |
| | | | 138/39 |
| 4,392,769 A | * | 7/1983 | Lowery .................. B65G 65/04 |
| | | | 14/69.5 |
| 4,408,946 A | * | 10/1983 | Haven .................... B66F 9/19 |
| | | | 414/403 |
| 4,537,554 A | * | 8/1985 | Collins, Jr. ............ B65G 67/20 |
| | | | 414/288 |
| 4,677,909 A | | 7/1987 | Beesley et al. |
| 4,832,559 A | | 5/1989 | Gebbardt |
| 4,923,356 A | | 5/1990 | Foster |
| 5,017,076 A | | 5/1991 | Condrey |
| 5,044,870 A | | 9/1991 | Foster |
| 5,054,987 A | | 10/1991 | Thornton |
| 5,186,596 A | | 2/1993 | Boucher et al. |
| 5,314,290 A | | 5/1994 | Lutz et al. |
| 5,338,140 A | * | 8/1994 | Ekdahl .................... B60P 1/38 |
| | | | 298/11 |
| 5,374,151 A | | 12/1994 | Matthews |
| 5,527,147 A | | 6/1996 | Hulls |
| 5,577,873 A | | 11/1996 | Tanaka et al. |
| 5,895,194 A | * | 4/1999 | Galas .................... B65G 67/22 |
| | | | 414/329 |
| 5,921,740 A | | 7/1999 | Stewart |
| 5,944,472 A | | 8/1999 | Scofield |
| 6,138,557 A | | 10/2000 | Brown et al. |
| 6,168,371 B1 | | 1/2001 | Lesmeister et al. |
| 6,309,164 B1 | * | 10/2001 | Holder .................. B65F 1/1452 |
| | | | 414/399 |
| 6,427,585 B1 | | 8/2002 | Brown et al. |
| 6,450,753 B1 | | 9/2002 | Hallstrom et al. |
| 6,709,219 B2 | | 3/2004 | Reed, III |
| 7,172,382 B2 | * | 2/2007 | Frankel .................. B65D 88/54 |
| | | | 414/288 |
| 7,275,906 B1 | | 10/2007 | Pool |
| 7,588,406 B2 | * | 9/2009 | Frankel .................. B65D 88/54 |
| | | | 414/288 |
| 7,699,575 B2 | | 4/2010 | Frankel |
| 7,744,330 B2 | * | 6/2010 | Haub .................... B30B 9/3042 |
| | | | 414/288 |
| 7,837,428 B2 | | 11/2010 | Adams et al. |
| 7,866,932 B1 | | 1/2011 | Pool |
| 8,257,007 B2 | * | 9/2012 | Williams ................ B60P 1/006 |
| | | | 414/345 |
| 8,662,813 B2 | * | 3/2014 | Bushong ................ B65G 67/20 |
| | | | 414/416.04 |
| 9,056,731 B1 | * | 6/2015 | Haub .................... B65G 67/20 |
| 9,120,632 B2 | * | 9/2015 | Uhrick .................. B65G 67/20 |
| 2001/0023854 A1 | | 9/2001 | Gearin et al. |
| 2003/0026678 A1 | | 2/2003 | Sumpter |
| 2004/0086363 A1 | | 5/2004 | Rohr |
| 2004/0151565 A1 | | 8/2004 | Zaun et al. |
| 2007/0098531 A2 | | 5/2007 | Byrne |
| 2007/0140819 A1 | | 6/2007 | Piveteau et al. |
| 2008/0219818 A1 | | 9/2008 | Adams et al. |
| 2009/0202325 A1 | * | 8/2009 | Wahls .................... B65D 88/56 |
| | | | 414/293 |
| 2011/0182705 A1 | | 7/2011 | Bushong |
| 2013/0216338 A1 | * | 8/2013 | Suzuki .................... B21D 5/00 |
| | | | 414/288 |

FOREIGN PATENT DOCUMENTS

| | | |
|---|---|---|
| SU | 1105429 A | 7/1984 |
| WO | WO8500347 A1 | 1/1985 |
| WO | WO9523105 A1 | 8/1995 |
| WO | WO9946195 A1 | 9/1999 |
| WO | WO03028434 A2 | 4/2003 |
| WO | WO2008030785 A2 | 3/2008 |
| WO | WO2009019449 A1 | 2/2009 |
| WO | WO2009107084 A1 | 9/2009 |
| WO | WO2010048674 A1 | 5/2010 |
| WO | WO2011098966 A1 | 8/2011 |

* cited by examiner

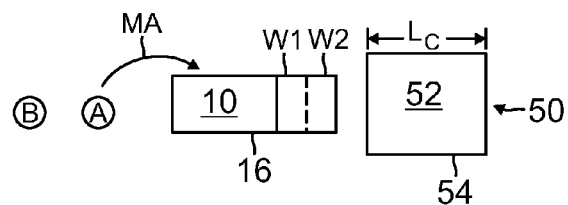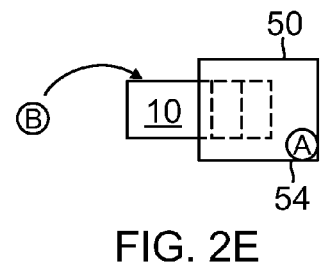
FIG. 2A  FIG. 2E
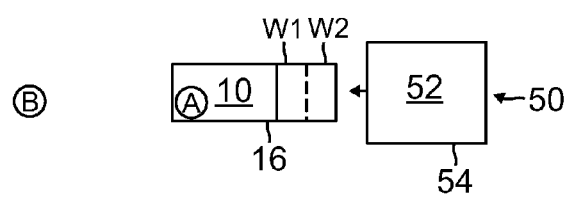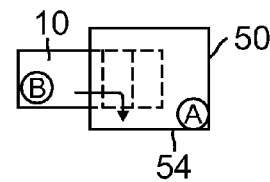
FIG. 2B  FIG. 2F
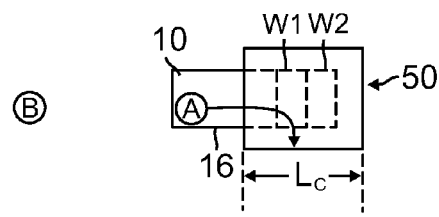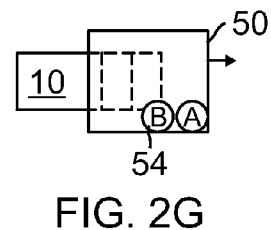
FIG. 2C  FIG. 2G
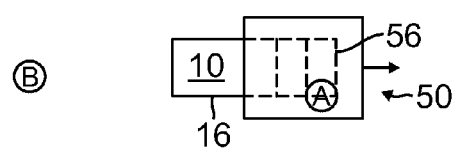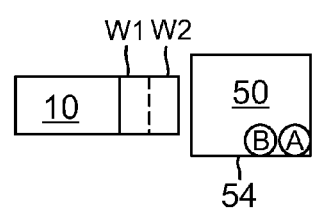
FIG. 2D  FIG. 2H

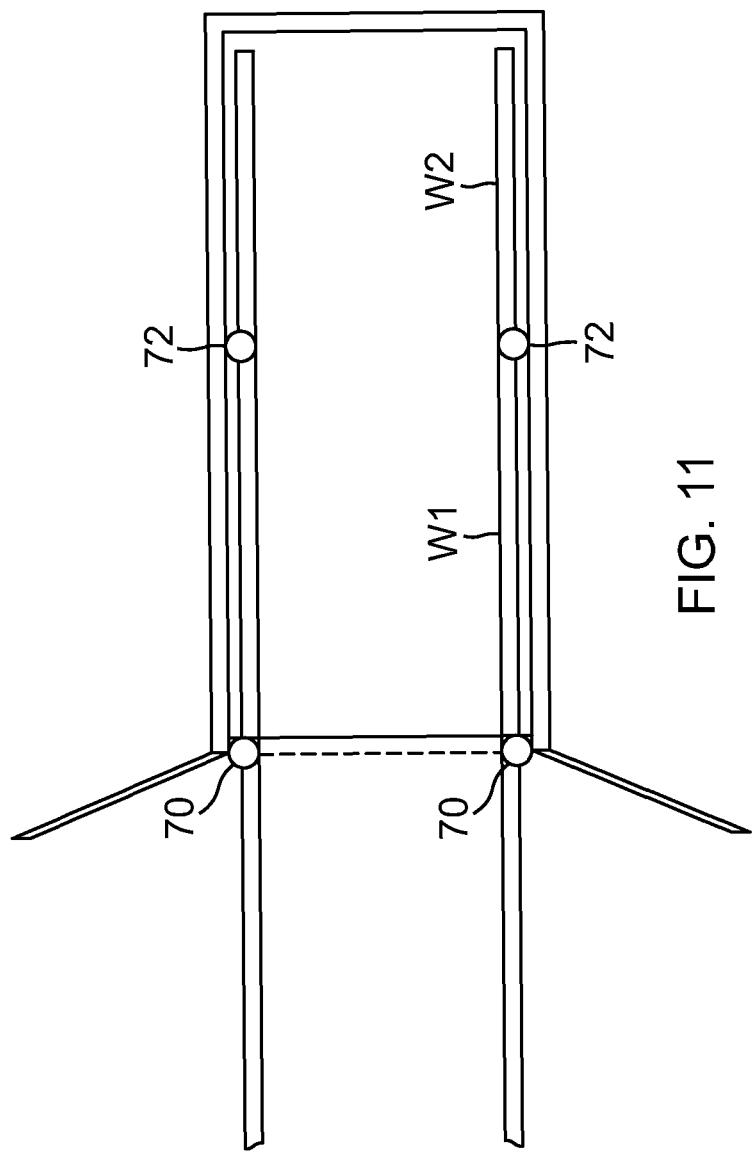

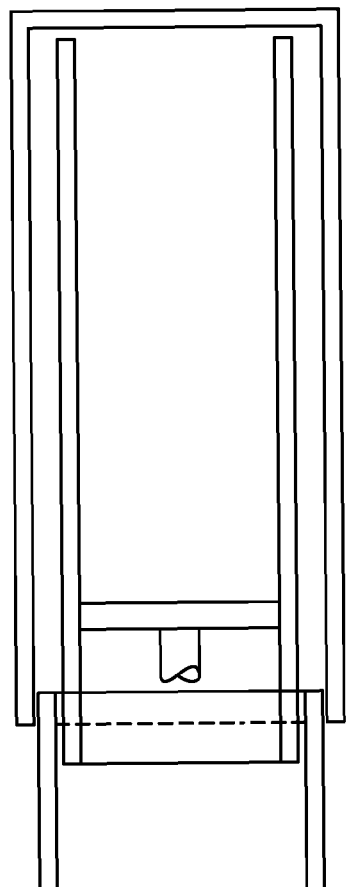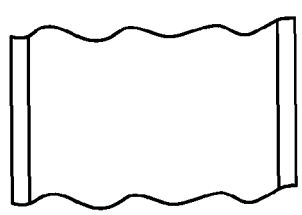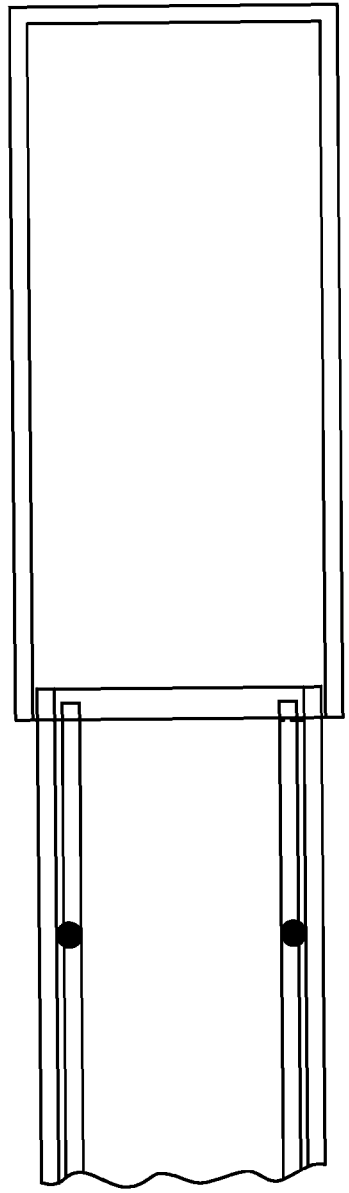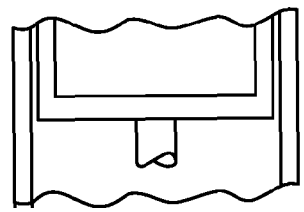
FIG. 12A
FIG. 12B

SYSTEM AND METHOD FOR PROTECTING CONTAINERS FROM DAMAGE DURING LOADING

CROSS-REFERENCE TO RELATED APPLICATIONS

This application claims the priority benefit of provisional application Ser. No. 62/152,148 filed on Apr. 24, 2015 and this application is also a continuation in part of application Ser. No. 14/058,029 filed on Oct. 18, 2013 which claims the priority benefit of provisional application Ser. No. 61/715,771, filed on Oct. 18, 2012, which priority benefit is also claimed, and all are incorporated by reference herein.

TECHNICAL FIELD OF THE INVENTION

The present invention relates to systems and methods for loading containers.

BACKGROUND

Container shipping is different from conventional shipping because it uses containers of various standard sizes—20 foot (6.09 m), 40 foot (12.18 m), 45 foot (13.7 m), 48 foot (14.6 m), and 53 foot (16.15 m)—to load, transport, and unload goods. Their internal lengths are about eight to ten inches less than the container's length. These containers are often eight feet wide by eight and a half feet tall, and their internal width is usually seven feet, seven inches and internal height is seven feet, nine inches. As a result of the standard, sizes, containers can be moved seamlessly between ships, trucks and trains. The two most important, and most commonly used sizes today, are the 20-foot and 40-foot lengths. The 20-foot container, referred to as a Twenty-foot Equivalent Unit (TEU) became the industry standard reference so now cargo volume and vessel capacity are commonly measured in TEU. The 40-foot length container—literally two TEU—became known as the Forty-foot Equivalent Unit (FEU) and is the most frequently used container today.

The container sizes need to be standardized so that the containers can be most efficiently stacked—literally, one on top of the other—and so that ships, trains, trucks and cranes at the ports can be specially fitted or built to a single size specification. This standardization now applies across the global industry, thanks to the work of the International Organization for Standardization (ISO) that in 1961, set standard sizes for all cargo containers.

Containers undergo loading and unloading of many types of material, such as scrap metal, that risk damage to the side walls of the container when the material is moved in-bulk into the container.

BRIEF DESCRIPTION OF THE DRAWINGS

FIGS. 2A through 2H are schematic side views illustrating operation of the loading system, according to an embodiment, showing a hopper on the left and a container (mounted on a truck or the like) on the right;

FIG. 11 is a view similar to that of FIG. 10 with the barrier walls in an extended position and inside a container for loading the container; and FIGS. 12A and 12B are views similar to that of FIG. 11 showing the barrier walls inside the container (FIG. 12A) and withdrawn from the container or about to be moved into the container (FIG. 12B).

DETAILED DESCRIPTION

Figure 1A:
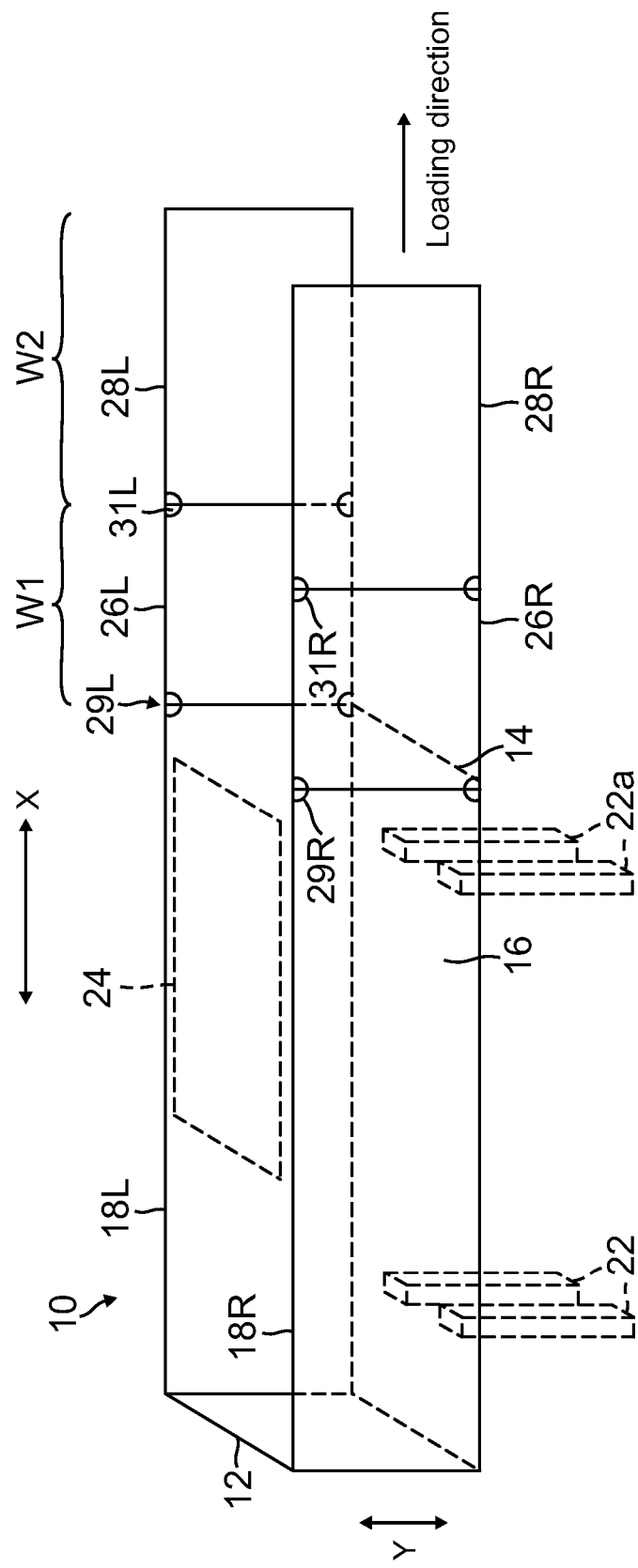
FIG. 1A is a schematic side perspective view of a loading system, according to an embodiment.

The term "containers" as used herein refers to those described in the BACKGROUND. When referring to a 20 foot or a 40 foot container, the meaning and dimensions thereof is that of the TEU and the FEU respectively as used in the technology as set out in the BACKGROUND and as known to persons having skill in the art. Also, all further references to 20 or 40 foot dimensions for barrier walls and barrier wall pairs are intended to refer to a dimension that will accommodate to the 20 foot and 40 foot dimensions of containers as used in the industry.

In one embodiment, invention includes the realization that the problem of loading containers with material that potentially can damage the container walls (by binding and/or colliding with corrugations on the walls or otherwise damaging) can be mitigated by inserting into the container, at the time of loading of the material, barrier walls which will be put in place proximate the opposite side walls of the container at or just before loading of the material into the container from a hopper. The term "proximate" indicates how close the barrier walls can be to the walls of the container and is intended to mean as close as practical given the variations in construction of the apparatus and in locating the barrier walls relative to the container walls. Placement of barrier walls spaced no more than one to three inches away from the container wall is considered "proximate" and is a good proximity. It is also the goal to avoid interference contact of the container wall by the adjacent barrier wall when being inserted into the container. While less than a one inch space would be desirable, it may be that the engineering tolerances used to build both the containers and the system and method described herein and to locate them for use would render such lesser space impractical, although nevertheless desirable in order to obtain use of as much of the volume of the container as practical.

This solution is implemented by embodiments disclosed herein.

In one embodiment a barrier wall is mounted on both free ends of walls of the hopper, i.e., at the open end of the hopper that from which material will be loaded from the hopper into the container. In this embodiment the container is moved into place with respect to the hopper (although vice versa is possible) so that the barrier walls extend into the container when in position for loading material into the container. It is the case that containers come in at least two common sizes, 40 feet long and 20 feet long as described above for the container industry. This embodiment also contemplates that the barrier walls can be of such length as to fit either a 20 foot or a 40 foot container. Also, the barrier wall pair can be mounted hingedly so as to rotate out of alignment with the hopper walls into a stored position. The stored position can be either an outer stored position, that is rotated to the exterior of the hopper or an inner stored position to be rotated to the interior of the hopper. Also, a version to accommodate either 20 or 40 foot containers can have barrier walls that each have a first and second barrier wall segment, the first segment of each barrier wall being for fitting a twenty foot container and a second barrier wall segment that may be folded back to enable accommodation of the twenty foot container. The second barrier wall segment may be extended to form a longer barrier wall to accommodate 40 foot containers.

The first barrier wall segment may be directly attached (or hinged) to the hopper walls and the second barrier wall segment may be hinged to the first barrier wall segment. That way when the second barrier wall segment is in extended position, the total length is sufficient to accommodate a 40 foot container.

The second barrier segment may be rotated out of the way (either interiorly or exteriorly, preferably exteriorly with respect to the first segment and hopper) leaving only the first barrier wall segment.

Also, a fully versatile version can have both the first and the second barrier wall pairs hingedly attached; the first to the hopper walls and the second to the first, so that the barrier walls can be fully folded away and not used, or in a first configuration with 20 feet of barrier wall pair available or in a second configuration with a total of 40 feet of barrier wall pairs available. The hinges where used preferably enable at least about a 180 degree rotation of the respective barrier wall segments, preferably outwardly and most preferably cannot rotate inwardly.

When the wall segments are in place, the container is then moved into position relative to the hopper so that material can be moved from the hopper into the container with the barrier walls inside the container, each barrier wall proximate to a container side wall. Then the material is moved by a ram into the container from the hopper while the barrier walls protect the container side walls. When loading is done, the container may be moved away from the hopper so that the barrier walls are no longer in the container.

In the second embodiment, barrier walls are linearly moveable into (and out of) the container, preferably while the material is being moved by the ram into the container. In this configuration the barrier walls are structured and moveable, e.g., on rails. The ram engages the barrier walls and together this ram and barrier wall assembly moves inside the hopper.

The ram (which also forms a closure wall of a far end of the hopper) preferably engages the barrier walls so as to support and push them and the material into the container. Therefore, when a loading space (the space in the hopper defined between the barrier walls and between the ram and front end of the hopper) is full of material, the ram is pushed forward along with the barrier walls into the container. In other words, the ram and barrier wall assembly and the material are simultaneously pushed into the container. Then the ram and barrier wall assembly is withdrawn leaving the material in the container. The ram and barrier wall assembly may be pulled back into the hopper after loading and/or the container may be moved away from the ram and barrier wall assembly (and away from the hopper).

As in the first embodiment, there can be a pair of barrier wall segments for a 20 foot container and a second pair of barrier wall segments for a 40 foot container, or a pair of barrier walls that can accommodate just a 20 foot container or just a forty foot container. Alternatively, there may be a pair of barrier walls that accommodate either a 20 foot container or a 40 foot container by having the ram selectively engage the barrier walls in a first position (e.g., at one end of the barrier walls remote from the open end of the hopper) for a 40 foot container or at an intermediate position for a 20 foot container.

As a further alternative, there could be two barrier wall segments per barrier wall, i.e., a first barrier wall segment for a 20 foot container, and a second barrier wall segment which together with the first barrier wall segment accommodates a 40 foot container. In this case, the second barrier wall segment could be hingedly attached to the first barrier wall segment so as to have an extended position to contain material and be pushed inside a container protecting the container walls, or it can be rotated out of the extended position, whether interiorly or exteriorly of the first barrier wall segment to allow only use of the first barrier wall segment. Preferably, this rotation would be outwardly, and would occur when the ram is fully extended, so that the hopper walls do not interfere with the rotation of the second barrier wall segment back onto the first barrier wall segment.

In another embodiment, the barrier walls can be any selected length, but is preferably (when fully extended) at least half or greater than half the container length, so as to accommodate a longer or longest container length (e.g., a 40 foot container) and the ram can be enabled to be fixed to the barrier walls at selected locations along the length of the barrier walls so as to accommodate whatever size container is in use at the time such as a shorter or shortest container length (e.g., a 20 foot container).

In a further embodiment, the barrier walls on each side of the hopper or on each side of the barrier wall assembly, as the case may be, have a difference in length.

FIG. 1A is a perspective view of a loading system, according to an embodiment. In FIG. 1A, the system includes a hopper 10 having a first end 12 (also called the rear end), a second end 14 (also called the front end), a floor 16 (also called a lower wall) and spaced apart lateral sides defined as a left side wall 18L and a right side wall 18R (looking forward from the first end). The hopper is open at the top. The hopper 10 may be supported by a support element for example in the form of one or more support legs 22 at or near the first end 12 such that the hopper 10 extends away from the support legs 22 along an X-axis. The hopper 10 may have an entirely open top, or more preferably has a top that is covered by a cover 24 (as shown by phantom line) supported on the walls 18L and 18R. The hopper 10 has a length L (extending along the X axis). If covered, hopper 10 is covered for preferably anywhere from about three quarters of the hopper length (or more) to about one half the hopper length (or less).

The system may further include one or more barrier wall pairs with barrier walls that are aligned with and/or fixed to a respective side wall of the hopper 10. Each barrier wall may extend along the X-axis away from the second end 14 of the hopper 10. Each barrier wall is configured to be received within a cargo container along with any other barrier walls so that each barrier wall of a barrier wall pair is located proximate a wall of the container. In one embodiment, two first barrier walls 26L and 26R (also designated as barrier wall pair W1) are disposed at the left and right lateral sides 18L and 18R respectively of the hopper 10. Also, optionally, there are two second barrier walls 28L and 28R (also designated as barrier wall pair W2). The respective barrier walls of second barrier pair W2 are pivotably attached to the terminal ends of the barrier walls of first barrier wall pair W1, and in the extended position as shown in FIG. 1, extend coextensively with the barrier walls of first barrier wall pair W1 along the X axis (which extends in a "loading direction"). The barrier walls may also have a top across each barrier wall pair, which preferably extends the entire length of at least the first pair W1 of the barrier walls or a substantial portion thereof. Each of the barrier walls have a length as elsewhere discussed herein.

The barrier walls can be either or both removable and/or hinged at joints 29L, 29R and 31L and 31R. They may also be fixed in place.

The system is used to load a container (e.g., a standard shipping container) preferably mounted on a truck (or other device for movement relative to the hopper). See, FIG. 7B and on for the container and truck illustrations. The truck may be driven in reverse (opposite the loading direction) from a position beyond the reach of the barrier walls to a position such that the barrier walls that are mounted to lateral sides of the hopper are received within the container. The barrier walls are preferably attached, preferably integrally attached to or unitary with, the hopper. The barrier walls may be removably attached to the hopper. The barrier walls preferably are attached before the container is moved into proximity with the hopper.

The floors (also called lower walls) of the hopper and of the container may be placed adjacent or near each other to facilitate transfer of material from the hopper into the container. A slight overlap of the floor of the hopper or a projection piece over the container floor is desirable so that there is no space between the end of the hopper and the container interior. The container may be disposed such that a downward projection piece of the lower wall of the hopper along the Y-axis would overlap with a lower wall of the container. Alternatively, the lower wall of the hopper may be disposed at the same, or approximately the same level as the lower wall of the container.

In some variations, the container receives only the barrier walls. The barrier walls may be fixed, fixed from sliding movement but rotatable, or set up to be movable (slidable) independently of the hopper so as be inserted into the container.

In other embodiments, the container receives the barrier walls and may receive a small (preferably insubstantial) part of the hopper, just enough to have a slight overlap to ensure no gap between the hopper and container floor to avoid potential problems.

Figure 1B:
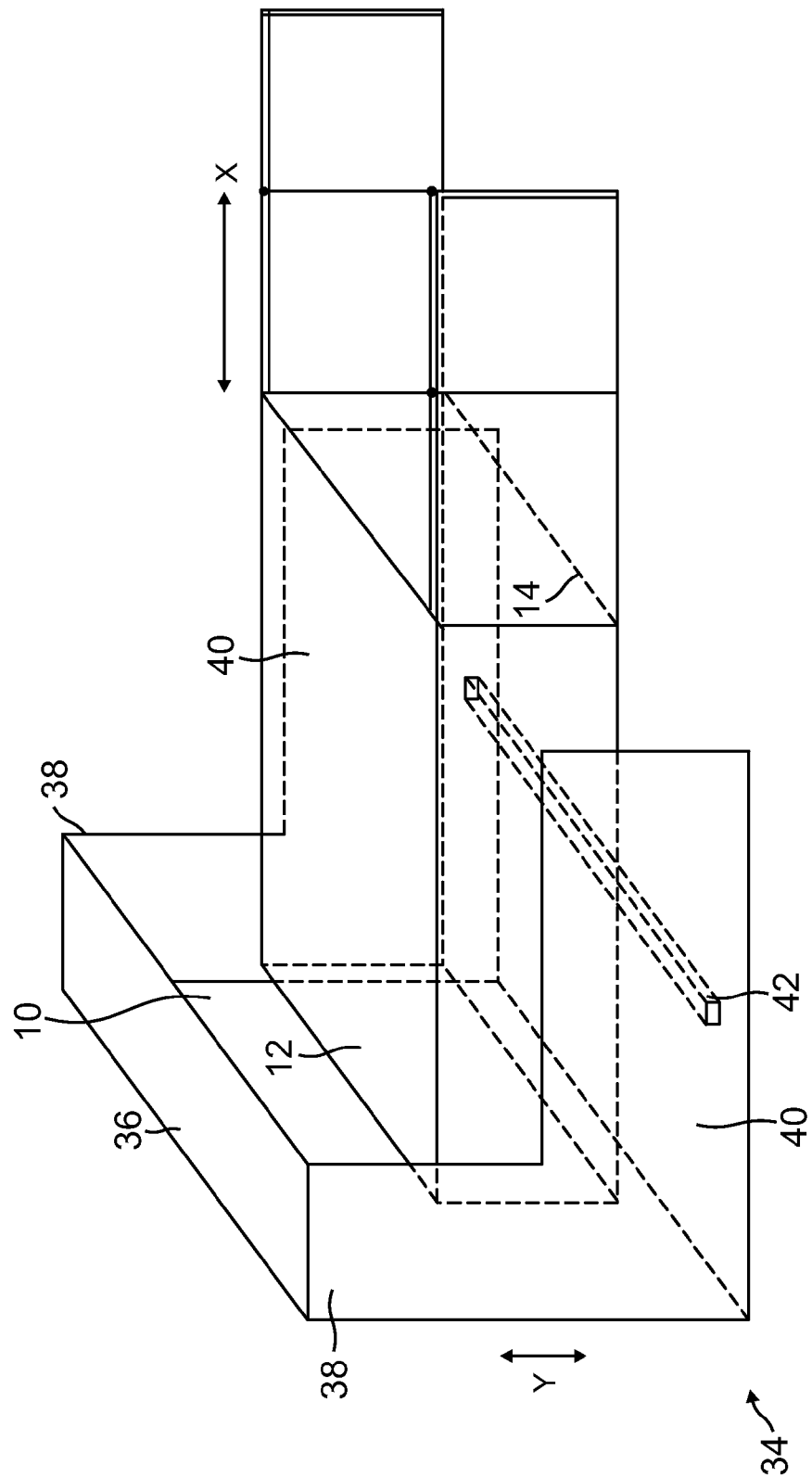
FIG. 1B is a schematic side perspective view of the loading system of FIG. 1A with a support frame, according to an embodiment.

The supporting element for the hopper may be mounted on or part of a support frame 34, as illustrated in FIG. 1B. The support frame 34 may include a cross beam 36 and a pair of spaced apart support legs 38, each extending downward from a respective end of the cross beam 36 along the Y-axis. Each support leg 38 may include a lateral beam 40 that extends along the X-axis toward the second end 14 of the hopper 10.

The lateral beams 40 may be configured to support the hopper on one or more cross beams 42, as well as on the support structure 34 at or proximate first end 12 of the hopper. This support beam 42 may be an I-beam, L-shaped section, or other cross-section. Preferably it is attached to and/or supports the bottom of the hopper 10, preferably about one third or from about one quarter to one half of the way from the first end 12 of the hopper 10 to the second end 14 of the hopper 10 but may be less than half way, half way, or more than half way to second end 14 and there may be more than one beam 420. Preferably, at least some portion of hopper 10 is cantilevered at second end 14 to enable at least a small portion of the container to overlap or sleeve around the hopper at second end 14.

Figure 7A:
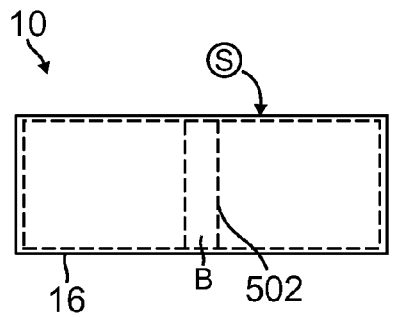
FIGS. 7A to 7D are schematic diagrams illustrating operation of the loading system of FIGS. 4 and 5 according to an embodiment where the ram is engaged with the barrier walls in the position B.
Figure 7B:
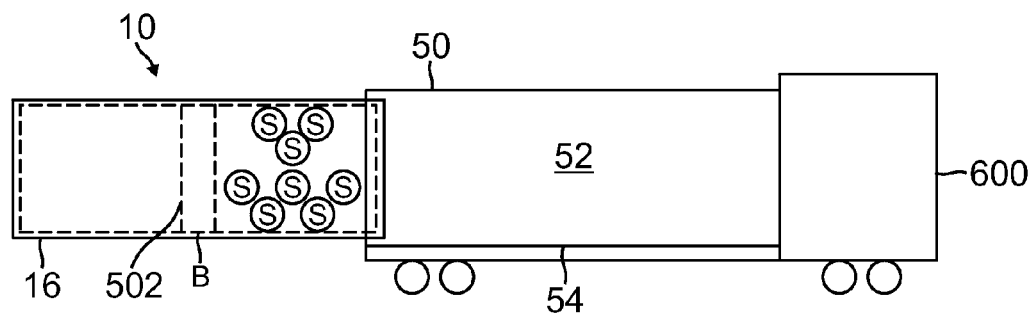
Figure 7C:
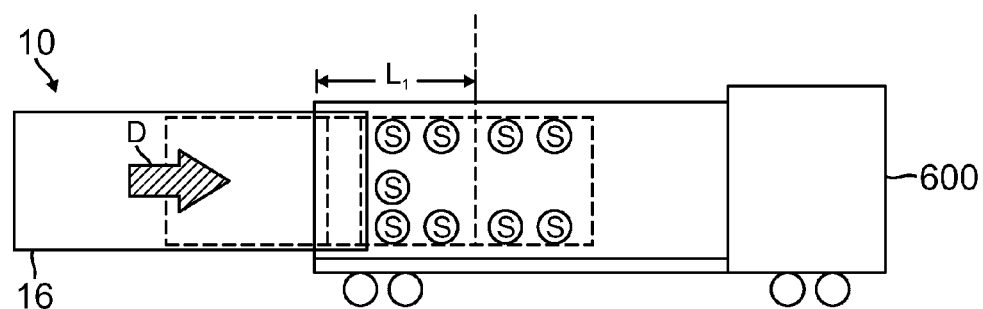
Figure 7D:
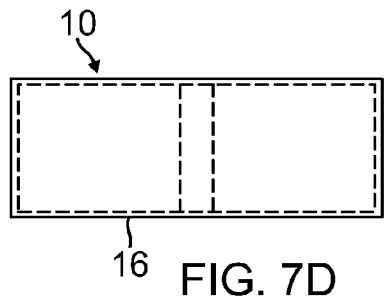

In embodiments shown in FIG. 7B and on, hopper 10 is used for loading a container 50 which has laterally extending (along the X axis or longitudinal direction of the hopper) sides 52 and a floor 54.

Loading of the system may occur in one motion (completely or substantially completely loading by loading the hopper with sufficient material and thereafter pushing the ram in one motion until the container is fully loaded or substantially full). Loading may alternatively occur in increments of partial hopper-loads or partial container-loads. For example, sufficient material from the hopper 10 to fill one-quarter, one-third, or one-half of a container 50 may be pushed in a first operation into the container 50. The material may be pushed across the floor 16 of the hopper 10 and across the floor 54 of the container 50. The first barrier wall pair W1 alone or with the second barrier wall pair W2 attached at lateral sides of the hopper 10 that are received in the container 50 are intended to prevent the moving material from scraping or denting the walls of the container 50 as it is being loaded, especially where the container walls are corrugated as is usually the case. Successive operations may be used to load additional one-quarter, one-third, or one-half amounts into the container 50. Between each operation, additional material may be loaded into the hopper 10 using a crane. The material may be pushed into the container 50 using a hydraulic piston or a vehicle (e.g., a Bobcat).

The barrier walls are preferably anywhere from ten feet to twenty (20) feet and even thirty (30) or forty (40) feet long, or anywhere in between, or about any of these lengths. Preferably they are about the length of the container to be loaded (being just at or just under such length, but the barrier walls can be about one half the length of the container to be loaded, one quarter, one third or other fraction of the length to be loaded (or about any of such lengths).

As noted above the barrier wall pairs can be dimensioned to accommodate use with a 20 foot container or a 40 foot container, or they can be hinged or pivotably attached so that a single assembly can accommodate twenty (20) foot containers or forty (40) foot containers by folding them or unfolding them. By way of example, a minimum of fifteen foot long barrier walls in each of the barrier wall pairs W1, W2 may work fine but preferably at least the barrier walls should be ten feet long, i.e., half the length of the container. The second barrier wall pair may be the same length as the first barrier wall pair, but it need not be. (Moreover, as explained elsewhere herein, any embodiment herein may be modified such that one side, e.g. the left side of the barrier wall(s) have a different length from the right side of the barrier walls.)

Figure 1C:
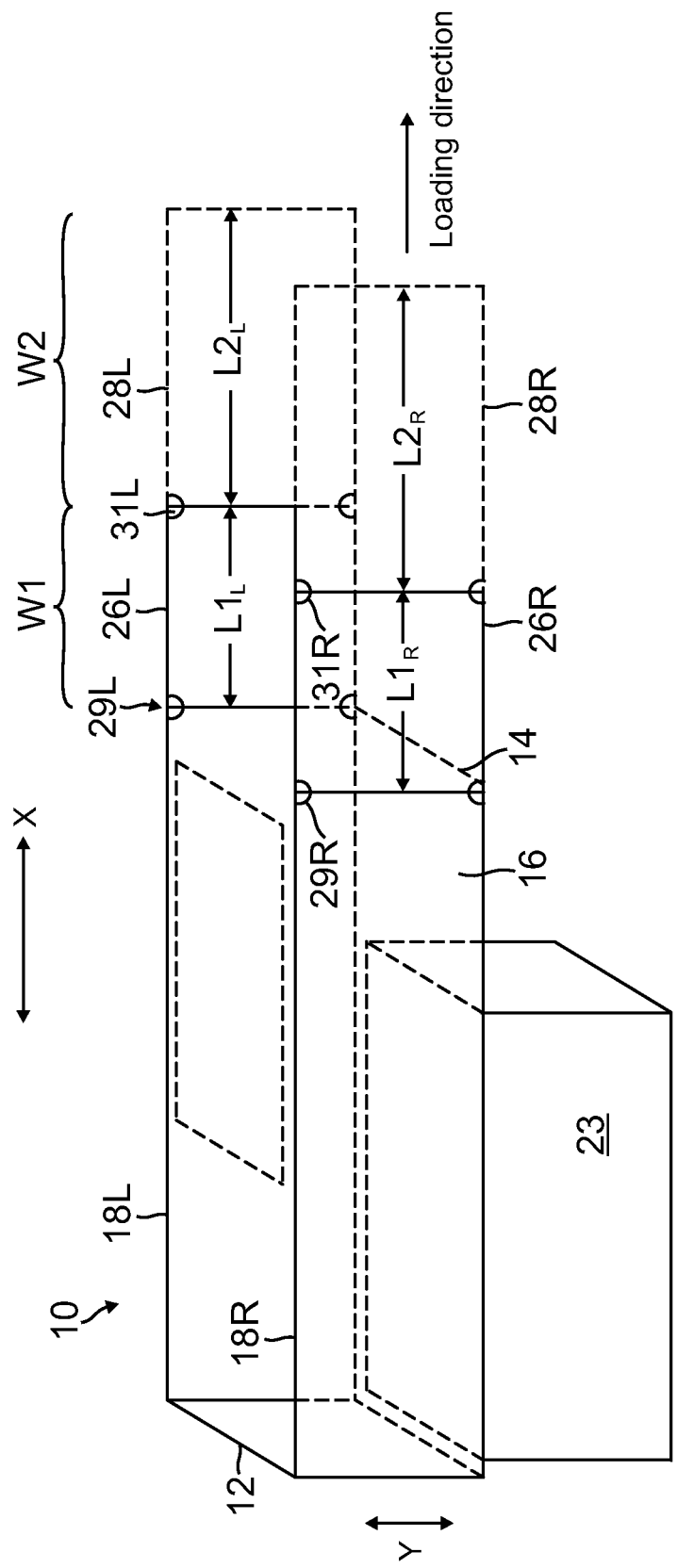
FIG. 1C is another schematic side perspective view of a loading system, according to an embodiment.

FIG. 1C is a view similar to FIGS. 1A and 1B, and showing an embodiment where the hopper is supported on a loading dock 23. In addition, in this embodiment, as in any other embodiment herein, the barrier wall(s) may all have the same length or different lengths. Here, for example, the left barrier wall(s) may extend for a total distance which is greater than the right barrier walls, although it can be vice versa. To achieve the different total lengths, the first (e.g., left) barrier wall 26L may be longer than the first right barrier wall 26R, and the second barrier walls 28L and 28R may have the same length. Accordingly, whether loading with just the first pair of barrier walls W1 (26L and 26R) or both the first and second pairs of barrier walls W1, W2 (26L, 26R, 28L and 28R), the length that the walls extend will be different on each side. Therefore, when loading a twenty foot container the wall lengths are different on each side and when loading a forty foot container the wall lengths are different on each side. The significance of using different length walls on each side is explained later.

FIGS. 2A through 2H illustrate operation of the loading system, according to an embodiment, and each includes material A, material B, a hopper 10, (first) barrier wall pair W1 or (first and second) barrier wall pairs W1 and W2, and a container 50 that has a floor 54. Material A and additional material B are representations of quantities of heavy metal scrap (HMS), but could represent other material such as lumber or metal scrap, and usually are the same type of material, e.g., HMS. As described above barrier walls are attached to opposite lateral sides of the hopper, defining the barrier wall pairs, but only one barrier wall is visible in the side views shown in FIGS. 2A through 2H.

FIG. 2A illustrates that material A may be loaded into the hopper 10. In the embodiment, the top of the hopper 10 is open, and material A may be loaded into the hopper 10 from above using a crane which is illustrated by arrow MA.

In FIG. 2B, the container 50 is moved towards the hopper 10 and the barrier wall pairs W1 and W2. The hopper 10 is loaded with material A. In some embodiments, as seen in FIG. 7B and on, the container 50 is mounted on a truck 60, and is moved toward the hopper 10 by backing the truck 60 towards the hopper 10. As seen in FIG. 2C, an open end of the container 50 receives the barrier wall pairs W1 and W2 and part of the hopper 10, which extend within the container 50.

In FIG. 2C, the container 50 is sleeved over the barrier wall pairs W1 and W2 as well as a small portion of the hopper 10 (e.g., a few inches or a foot or so). The end of the barrier wall pairs W1 and W2 may not extend all the way into the container. In an embodiment, the barrier walls extend all the way into the container to protect the full length of an inner lateral walls 52 of the container that are adjacent to the barrier walls of the barrier wall pair. Preferably, the barrier walls extend at least half way into the container.

The steps represented by FIGS. 2A and 2B to 2C may be reversed in order (i.e., FIGS. 2B and 2C then FIG. 2A), although the order in the drawings is preferred to help minimize risk during loading of the hopper of damage to the truck and/or container.

With continued reference to FIG. 2C and also to FIG. 2D, container 50 and hopper 10 are held in place while material A is moved into the container. As material A is moved into the container 50, the material preferably slides along the floor 16 of the hopper 10. At the edge (the end 14) of the hopper 10, material A falls (preferably a very slight fall, e.g., an inch or a couple of inches, onto the floor 54 of the container 50. After the material falls to the floor 54 of the container 50, material A continues to be pushed by the ram and slide across the floor 54 of the container 50 and may slide along the barrier walls of the barrier wall pairs W1 and W2 as well. The barrier walls protect the inner lateral walls (the side walls) 52 of the container 50 as material A is pushed into the container 50. As in all embodiments herein, the ram pushes the material into the container until the container is loaded the desired amount, which preferably is until the ram is proximate the free end of the hopper and/or the container is full.

No relative motion occurs between the container 50 and the hopper 10 in FIG. 2C as material A is loaded into the container.

In FIG. 2D, material A has been loaded into the container 50. Although illustrated as being partly in the container 50, material A may be pushed as deep into the container 50 as possible, until it abuts against a far inner surface 56 of the container 40. After all desired material A has been loaded, container 50 can be moved away from the hopper 10, and the container doors may be closed.

Alternatively, the container 50 may be moved away by a short distance to permit further loading of the container 50. However, it is preferred that the material be loaded in one motion of the ram without moving the container. In any event, as the container 50 is moved away from the hopper 10, the barrier wall pairs W1 or W1 and W2 is/are extracted (relative to the container, e.g., by moving the container or in some embodiments by withdrawing the walls) from between material A and the inner lateral walls 52 of the container.

In FIG. 2E, the container 50, and material A that is contained therein have been moved a short distance away from the hopper 10, but the container is still in loading position (barrier walls in the container). Material B (which may be the same as material A) can be loaded into the hopper 10 at this time anticipating being moved into the container 40. In other embodiments, material B may be loaded into the hopper 10 in the operation of FIG. 2A, or just prior to the operation of FIG. 2D.

In FIG. 2F, after material B has been loaded into the hopper 10, material B can be moved into the container 50. Material B may be pushed into the container 50 using a hydraulic piston, or by being pushed by a vehicle, such as a Bobcat or bulldozer.

As material B is moved into the container 50, it first slides across the floor 16 of the hopper 10. When material B reaches the edge of the floor 16 of the hopper 10, it falls to the floor 54 of the container 50 adjacent to the barrier walls of barrier wall pairs W1 or W1 and W2. As material B continues to be pushed into the container 50, it then slides across the floor of the container 50. Material B may be pushed as far as it can go into the container 50, and may be abutted against material A.

No relative motion occurs between the hopper 10 and the container 50 in the operation of FIG. 2F.

In FIG. 2G, after material B has been loaded into the container 50, the container 50 may be moved away from the hopper 10, which preferably remains stationary. As the container 50 is moved away from the hopper 10, the barrier wall pair(s) W1 or W1 and W2 that is/are attached to the hopper 10 is/are extracted from between material B and the inner lateral walls 52 of the container 40.

In other embodiments, the barrier walls may not be attached to the hopper or may be disengaged from the hopper, and may be moved away from the hopper with material B and the container. The barrier wall may then be extracted after the container and the hopper have been separated. Such an alternative may be used with other embodiments described herein.

In FIG. 2H, the container 50 loaded with material A and material B has been separated from the hopper 10 and the barrier wall pair(s) W1 or W1 and W2. This incremental loading process may continue if desired until the container has the desired amount of material therein.

Figure 3A:
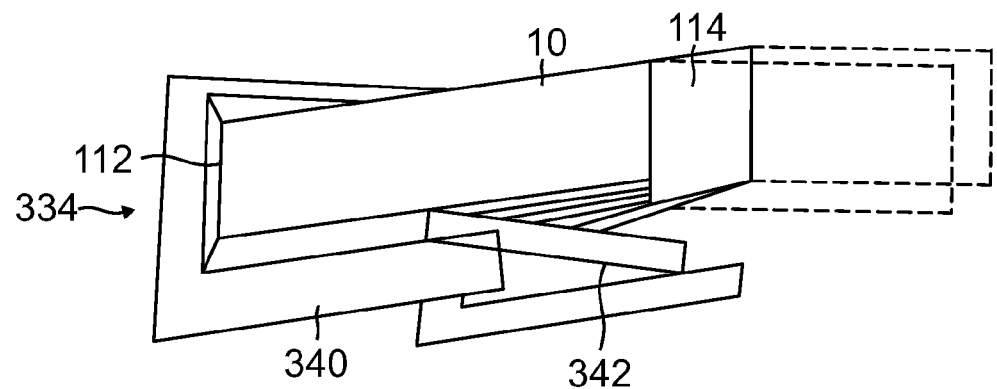
FIG. 3A is a schematic side perspective view of a hopper mounted on a support frame.
Figure 3B:
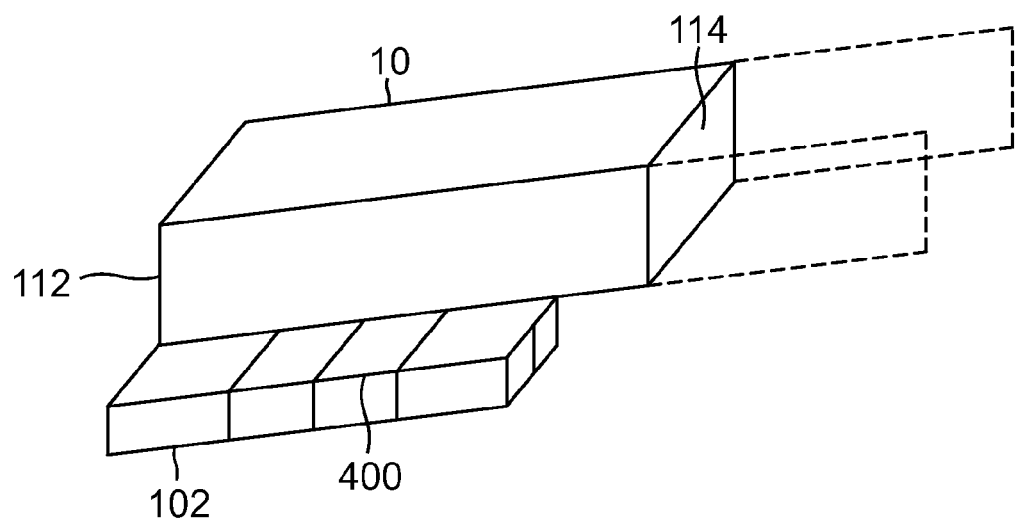
FIG. 3B is a schematic side perspective view of a hopper mounted on a pad or loading dock.

FIG. 3A is a schematic view of a hopper 10 supported on a support frame 334 and FIG. 3B is a schematic view of a hopper 10 supported on a pad or loading dock 400, such as a concrete pad, or loading dock. With reference to FIG. 3A, rear end 112 of the hopper 10 is supported on the support frame 334. In addition, preferably the support frame 334 has lateral beams 340 that hold a cross beam 342 less than, the same as, or more than halfway along the length of hopper 10 from rear end 112 to front end 114 of the hopper. That is, closer to the front end 114 of the hopper 10 than the rear end 112. The cross beam 342 may be fixed or movable. The front end, also called the open end 114 of the hopper 10 may have barrier walls (not shown) thereon, in accordance with any other embodiment disclosed herein.

As shown in FIG. 3B, instead of the support frame 334, the hopper 10 may be on a concrete pad or loading dock 400. The hopper 10 also has an open front end 114 and barrier wall pair(s) not shown. The end of the concrete pad or loading dock 400 may be more than, less than or the same as the halfway point along the length of the hopper, like the location of the cross beam 342. In any embodiment, it is desirable that the hopper have at least some cantilevered portion of its length so that the container may be sleeved over a portion of the open end 114 of the hopper. The amount of the cantilever needs to be at least as much as the desired maximum amount of overlap between the container and the hopper during the loading process.

In another embodiment, the barrier wall pair(s) are movable with a ram configured as a large plate (actuated by the hydraulic piston). The ram engages the barrier wall pair(s) W1 or W1 and W2 and pushes them into the container as the ram moves to load the container and pulls the barrier walls back once the container is loaded. Preferably, the barrier wall pairs slide along a rail, somewhat like a file cabinet drawer slide, except preferably without ball bearings. However, ball bearings or other bearing member or mechanism may be used if desired.

Figure 4:
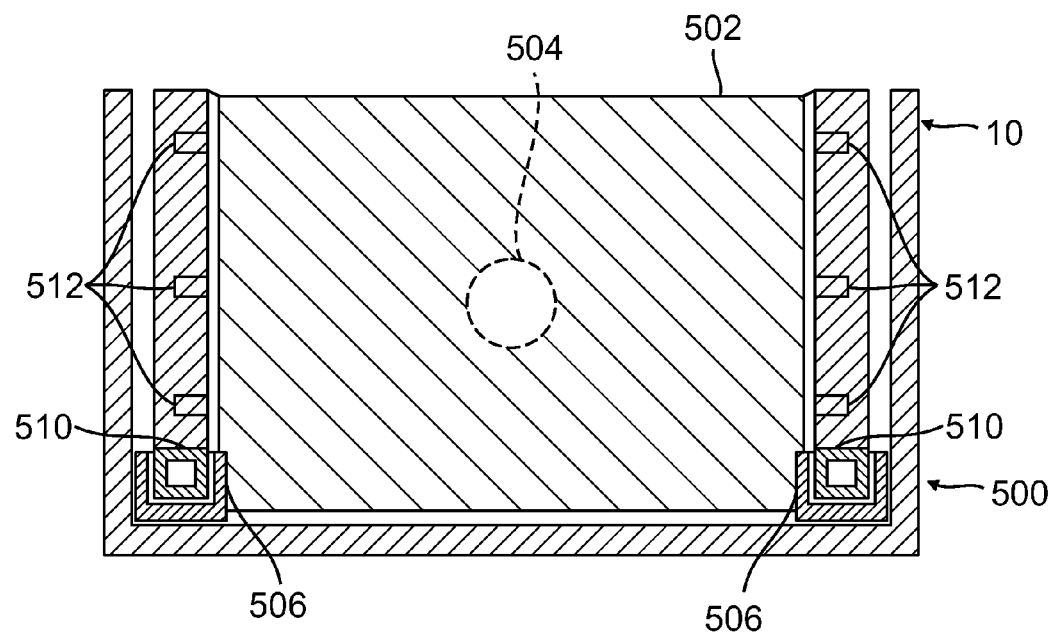
FIG. 4 is a front schematic view of the hopper in a loading system, according to an embodiment, where there are moveable barrier walls on rails and which barrier walls are engaged with a ram.

As shown in the sectional view of FIG. 4 which view is normal to and through the hopper walls, barrier walls and ram, loading device 500 has a hopper 10 as in the previous embodiments. Also as in the previous embodiments, the ram 502 is essentially a large plate which is movable through the hopper 10 by means of a hydraulic piston 504, or by being pushed by a vehicle, such as a Bobcat or bulldozer. Preferably the power source for moving the ram 502 can move up to about thirty tons or more through the hopper.

In this embodiment, the barrier wall pair(s) W1 or W1 and W2 are mounted so as to slide forward (out of the front of the hopper—i.e., toward the viewer in FIG. 4) in the x axis or loading direction, and move back (into the hopper—away from the viewer in FIG. 4) together with the ram 502. The barrier wall pair(s) only move when coupled to the ram 502, and only then when the ram 502 moves. The barrier wall pair(s) preferably have no other mechanism to move them, and they move independently of the hopper 10.

In this embodiment, the barrier walls are mounted on rails 506 formed by an angle iron, e.g., formed in a U-shape, e.g., by two angle irons or an L-shape, e.g., by one angle iron. The barrier walls W1, W2 may have square tubing 510 or other mechanism fixed (e.g., welded) thereto for promoting sliding within the angle iron (rail) 506. The barrier walls W1, W2 may be made without the square tubing, so that the bottom of the barrier walls sit in the rails.

Figure 5:
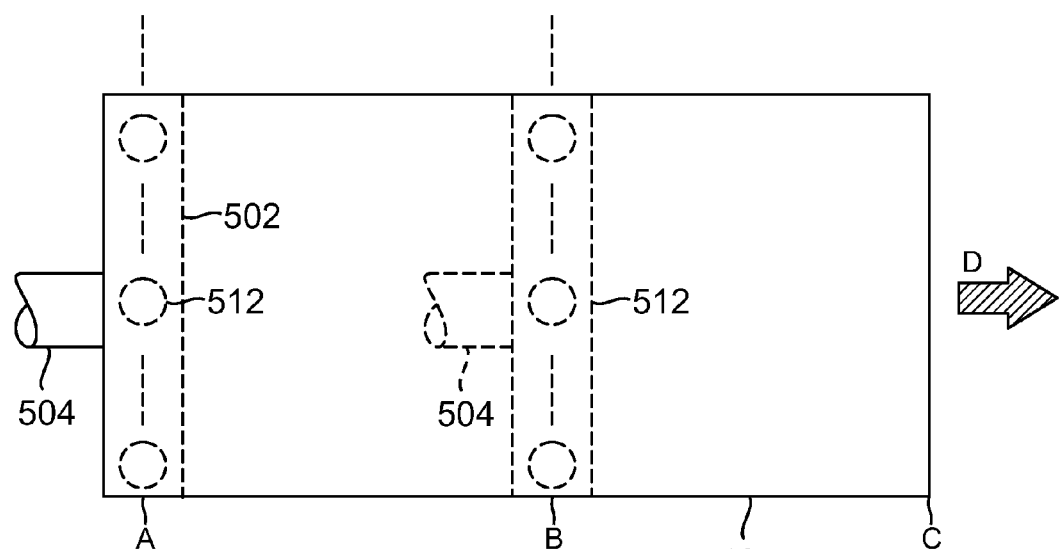
FIG. 5 is a side schematic view of the hopper of FIG. 4 in the loading system of FIG. 1A or FIG. 1C showing potential positions A and B of the ram and barrier walls being engaged therewith, according to an embodiment.

As shown in FIG. 5 a schematic side view with respect to FIG. 4, the ram 502 can be engaged with the barrier wall pair(s) in two or more desired positions A and B. In position A, the ram 502 is attached proximate one end of the barrier wall pair(s). Therefore, a length of the barrier wall pair(s) from A to C can extend out from the hopper 10 when the ram moves in direction D. For a forty foot container, the barrier wall pair(s) may extend thirty five to forty feet (or about thirty five to forty feet) or other desired amount such as at least twenty feet total or at least thirty feet total beyond the end of the hopper. The container, during loading, may have a slight overlap with the base of the hopper, e.g., up to a foot or two. The container is preferably loaded in one push of the ram. The barrier wall pair(s) will extend into the container and protect the container side walls from damage. In some instances, barrier wall pair(s) that extend only about fifteen to twenty feet (or other desired amount) will be sufficient, even for a forty foot container, to fully load the container in one motion with the ram.

For a twenty foot container, e.g., the ram may engage the barrier walls at position B. Therefore, when the ram moves in direction D, the barrier walls extend past the free end of the hopper by the distance from points B to C, for loading. The barrier walls may be half the lengths disclosed above as compared to the forty foot container loading system.

As can be seen in FIGS. 4 and 5, engagement pins 512 may be used to engage the barrier walls at the desired position A or B or other position. The engagement pins 512 may be retractable. They may be spring-loaded to extend into an engagement position into corresponding holes or recesses in the barrier walls and they may be lockable in a retracted position and/or extended position. The mechanism holding the pins is preferably mounted to the back of the ram, but could be at the side or front. Other engagement mechanisms may be used. E.g., the pins may be mounted to the barrier walls and the ram may have holes or recesses at appropriate corresponding positions. The pins and holes and other mechanism for engagement of the ram and barrier walls may be referred to a coupling and decoupling mechanism.

Figure 6A:
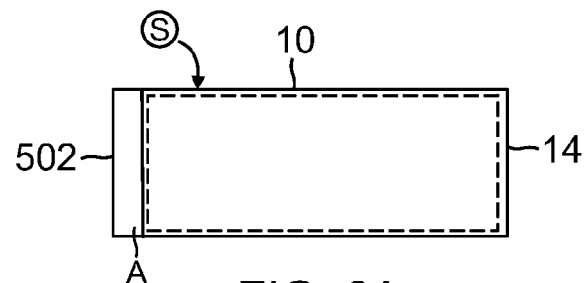
FIGS. 6A to 6D are schematic diagrams illustrating operation of the loading system of FIGS. 4 and 5 according to an embodiment where the ram is engaged with the barrier walls in the position A.
Figure 6B:
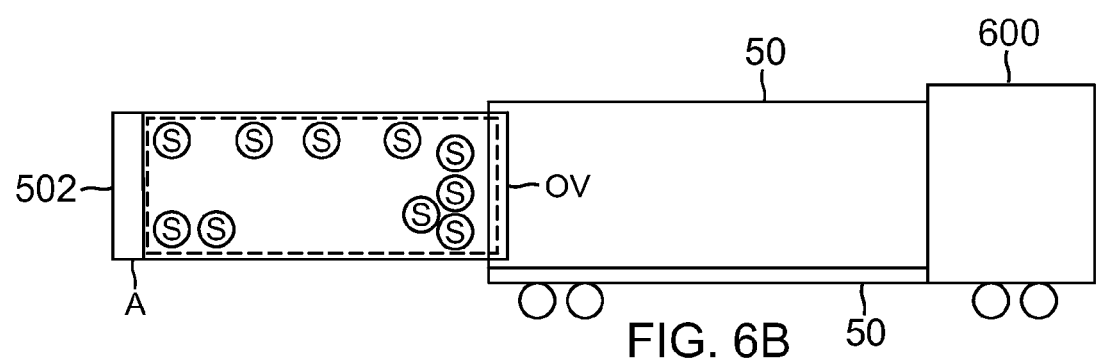
Figure 6C:
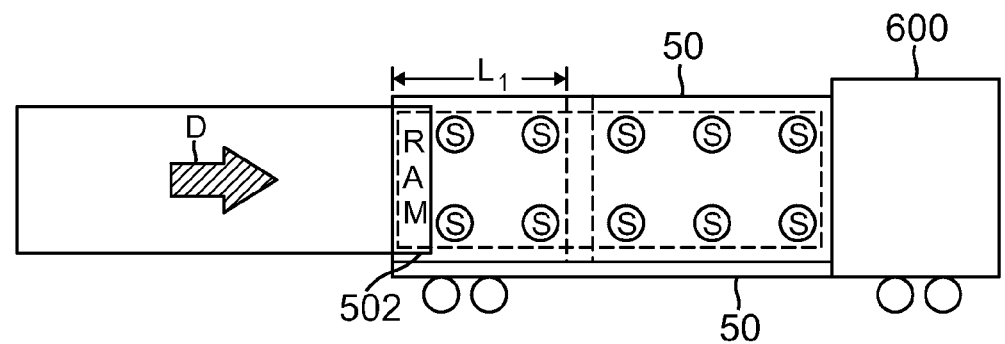
Figure 6D:

In FIGS. 6A to 6D, the container loading process is shown for a container that is approximately or exactly, or longer than, the length of the barrier walls. The ram 502 starts in position A. In FIG. 6A, hopper 10 is loaded with materials S, such as scrap metal. In FIG. 6B, a truck 600 carrying container 50 is backed up to the hopper's free, open end 14. There preferably is a slight overlap (OV) of the end of the hopper and the container (See FIG. 6B). In FIG. 6C, ram 502 is connected to the barrier wall pair at position A (or it was connected earlier in the sequence or it started with that connection existing). The truck 600 and container 50 are preferably stationary, when the ram 502 moves in direction D pushing all the scrap S into the container. The ram 502 may then be retracted back to the position of FIG. 6A, as shown by FIG. 6D. The truck 600 and container 50 may move away, after loading is complete, and either before or after retracting the ram.

FIGS. 7A to 7D shows a loading sequence similar to that of FIGS. 6A to 6D, except that the ram 502 is positioned and connected at position B to the barrier wall pair(s), such as for loading a container that is shorter than (e.g., half the length of) the container of FIG. 6B or FIG. 6C. (See. e.g., FIG. 7A) The portion of the hopper 10 in front of the ram 502 is loaded with scrap S, and then the truck 600 and container 50 (e.g., a twenty foot container) are moved into position as in FIG. 6B. (See FIG. 7B) Then the ram 502 and barrier wall pair move into the container 50, the ram 502 pushing the scrap S into the container. (See FIG. 7C) After loading, the truck 600 and container 50 may be moved away. The ram 502 and barrier wall pair(s) may be retracted before or after removing the truck and containers. (See FIG. 7D)

Figure 8:
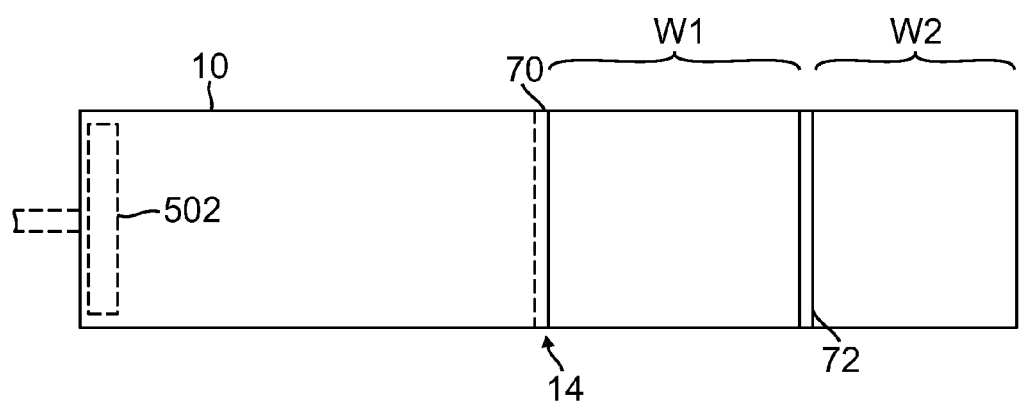
FIG. 8 is a side schematic side view of a loading system according to an embodiment where the barrier walls have a hinge or hinges, showing the barrier walls in an extended position.
Figure 9:
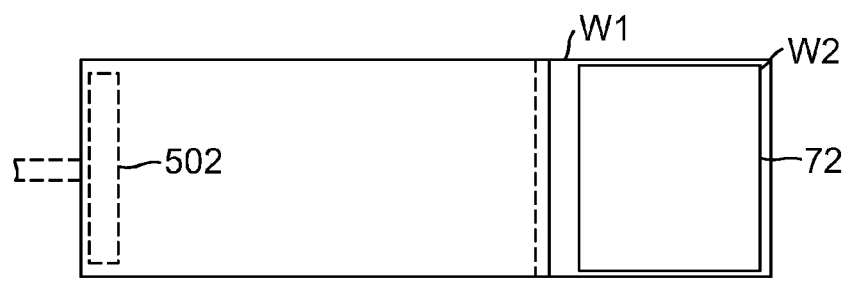
FIG. 9 is a side schematic view of the embodiment of FIG. 8, showing a first part of the barrier walls extended and a second part of the barrier walls folded back on the first part of the barrier walls.
Figure 10:
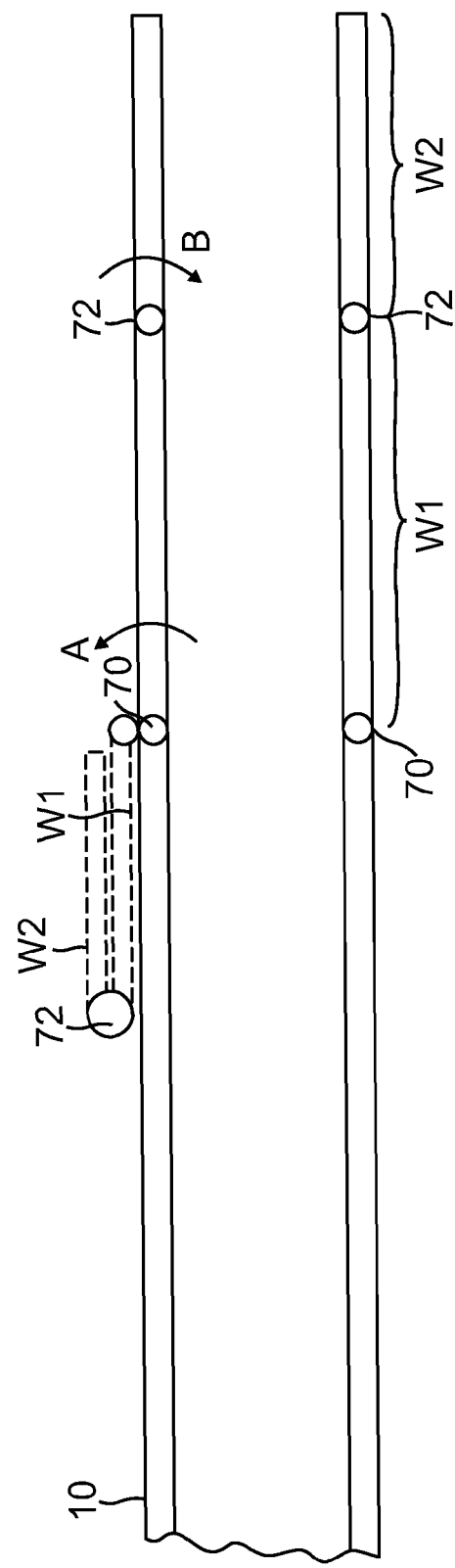
FIG. 10 is a top schematic view of a loading system according to an embodiment where the barrier walls have a hinge or hinges showing the barrier walls in an extended position and in phantom lines showing the barrier walls rotated (pivoted) to a stored position.

Another embodiment is shown in FIGS. 8 to 10, where a barrier wall pairs W1 and W2 are fixed to the end of the hopper 10. A first part of the barrier wall pair(s) W1 is attached to a free end 14 of the hopper. The barrier wall pair W1 may be fixed or hinged to that end of the hopper 10 by hinges 70. The second barrier wall pair W2 is hinged by hinges 72 to the first barrier wall pair W1. The length of the barrier wall pairs in FIG. 8 with W1 and W2 in alignment and extended may be the same or similar to the length of the barrier wall pair(s) of FIG. 6A to 6D. The loading sequence may be the same as in FIGS. 6A to 6D, except that the barrier wall pair(s) do not slide. Just the ram moves in FIG. 8. However, one could modify the barrier wall pair(s) of FIGS. 6A to 6D to have a hinge as in FIG. 8 if one wanted to do so. If one uses the optional hinge version of FIG. 8, then the entire barrier wall pairs W1 and W2 could be folded back for storage by rotating W1 in one direction and W2 in the opposite direction.

For example as shown in FIGS. 8 and 10 the barrier wall pair W1 can be rotated exteriorly of the hopper 10 as by the arrow A (counterclockwise for the top barrier wall of the first barrier wall pair W1 and clockwise for the lower wall of the barrier wall pair W1) into the position shown in phantom lines in FIG. 10. The second barrier wall pair W2 may be folded interior to or exterior to the walls of the first barrier wall pair, e.g., to be in the position shown in phantom in FIG. 10. The hinge 72 may allow barrier wall pair W2 to fold in either direction or just one direction. The hinge(s) may lock into a position, such as in the straight/extended position of the barrier walls, such as by a friction fit or other mechanism of locking or holding the barrier walls in alignment.

In FIG. 9, barrier wall pair W2 is folded back 180 degrees on barrier wall pair W1 at hinge 72 which connects the first and second barrier wall pairs W1 and W2. In this position, the loading sequence would be comparable to that of FIGS. 7A to 7D, for a container of a second length (shorter than a first length) e.g., for a twenty foot container as opposed to a forty foot container. The barrier wall pair(s) do not slide. Only the ram 502 pushes while loading.

With the system and position of FIGS. 8-11, one could selectively load twenty foot containers with the walls of barrier wall pair W2 folded back on the walls of barrier wall pair W1 while barrier walls W1 are extended, or forty foot containers with both barrier wall pairs W1 and W2 fully extended.

The relative length of the barrier wall pairs W1 and W2 could be the same, or one of them may be longer than the others. A mechanism to lock W2 in the position of FIGS. 8A and 8B and/or the position of FIG. 9A may be used, but is optional.

In another embodiment, as shown in FIG. 1C, wall 26L may be shorter than wall 28L or vice versa. For example, wall 26L has a length $L1_L$ which is shorter than wall 26R which has length $L1_R$. This differential may be at least one foot, or at least two foot, and more preferably five feet, or at least five feet. In addition, a length $L2_L$ of wall 28L may be the same as, longer than or shorter than a length $L2_R$ of wall 28R and/or the same as, longer than or shorter than length $L1_L$.

Moreover, both wall pairs W1 and W2 may be significantly shorter than a length $L_c$ of the side walls of the container (see FIG. 2A showing $L_c$). Wall length $L1_L$ may be only three quarters of container length $L_c$. Alternatively, wall length $L1_L$ may be less than three quarters of container length $L_c$, or even half thereof or less than half thereof. In fact, wall length $L1_L$ may be about forty percent of container length $L_c$, or even less than that, e.g., one third or one quarter. In this embodiment, length $L2_L$ may be the same or substantially the same as length $L1_L$. In spite of the shorter and/or differential lengths in this instance, the entire container may be loaded with scrap in one step without moving the container relative to the walls and hopper during the loading step.

The shortened (equal length or offset) and/or offset walls (walls with differential length "D") embodiments may be combined or used individually, and may be combined or individually used with the movable walls embodiment.

Where wall 26L has length $L1_L$, wall 28L has length $L2_L$, wall 26R has length $L1_R$ and wall 28R has length $L2_R$, the disclosed relationships may be summarized and/or supplemented as follows:

$L1_L=L2_L=L1_R=L2_R$ (all walls are the same length)

$L1_L<L2_L=L1_R=L2_R$ (enables same differential "D" between left and right side walls to exist whether one wall pair W1 or two wall pairs W1, W2 are used for loading; left side is shorter)

$L1_R<L1_L=L2_L=L2_R$ (enables same differential "D" between left and right side walls to exist whether one wall pair W1 or two wall pairs W1, W2 are used for loading; right side is shorter)

$L1_L>L2_L=L1_R=L2_R$ (enables same differential "D" between left and right side walls to exist whether one wall pair W1 or two wall pairs W1, W2 are used for loading; left side is longer)

$L1_R>L1_L=L2_L=L2_R$ (enables same differential "D" between left and right side walls to exist whether one wall pair or two wall pairs are used for loading; right side is longer)

$L1_R>L1_L$ and $L2_L=L2_R \geq L1_R$ (enables same differential "D" between left and right side walls to exist whether one wall pair or two wall pairs are used for loading; right side is longer; and walls 28L and 28R are the same length and both greater than or equal to the length of wall 26R which enables the possibility of having the second wall pair W2 have a length of one half of the length of the longer container to be loaded, e.g., forty foot container so walls 28L and 28R can be twenty feet (20') long, which keeps a gap between the end of the forty foot container and a barrier wall length the same as a gap between the end of a twenty foot container and a barrier wall length)

$L1_L>L1_R$ and $L2_L=L2_R \geq L1_L$ (enables same differential "D" between left and right side walls to exist whether one wall pair or two wall pairs are used for loading; left side is longer; and walls 28L and 28R are the same length and both greater than or equal to the length of wall 26L which enables the possibility of having the second wall pair W2 have a length of one half of the length of the longer container to be loaded, e.g., forty foot container so walls 28L and 28R can be twenty feet (20') long, which keeps a gap between the end of the forty foot container and a barrier wall length the same as a gap between the end of a twenty foot container and a barrier wall length).

$L1_L \geq L1_R$ (or $L1_L \leq L1_R$) and $L2_L = L2_R > L1_L$ and also $L2_L = L2_R > L1_R$ (second barrier wall pair is longer than the first barrier wall pair; left barrier wall may be greater than or equal to length of right barrier wall, or vice versa; second barrier wall pair being longer than first barrier wall pair enables the possibility of having the second wall pair W2 have a length of one half of the length of the longer container to be loaded, e.g., forty foot container so walls 28L and 28R can be twenty feet (20') long, which keeps a gap between the end of the forty foot container and a barrier wall length the same as a gap between the end of a twenty foot container and a barrier wall length).

Variations of the above relationships are certainly possible. The above are preferred relationships.

While the foregoing embodiments have described barrier wall pairs of equal length on each side, in an embodiment, the barrier walls can be different in which one side is longer than the other side; these are defined as "uneven barrier wall lengths". An example is shown in FIG. 1C in which the phantom lines of barrier wall 28R are meant to indicate that it can be omitted in which case the left barrier wall length will be greater than the right barrier wall length. Of course any length difference can be implemented and it can be implemented in either the hopper embodiment of FIG. 1A or the barrier wall assembly embodiment of FIGS. 4 and 5. The length difference embodiment comes into beneficial after the container has been loaded, As the barrier wall or walls are being withdrawn either by pulling back the ram and barrier wall assembly (in the embodiment of FIGS. 4 and 5 or by moving the container away (in the embodiment of FIG. 1A), invariably, some of the material loaded into the container falls out of the container as the barrier walls and the container move relatively away from each other. The cause of this material falling out is due at least in part to friction between the barrier walls and the material such that the material in some portion is dragged back with withdrawal of the barrier walls, and falls out. When the barrier walls are not of the same length, however, the material compacted into the container has less frictional engagement to the barrier walls than when the barrier walls are the same length because the shorter side allows the material an escape from the friction to more freely stay in the container. This difference in length should be at least one foot and more preferably at least two feet and most preferably at least five feet.

FIGS. 12A and 12B are views similar to that of FIG. 11 showing the barrier walls inside the container (FIG. 12A) and withdrawn from the container or about to be moved into the container (FIG. 12B). In this embodiment, as in any of the embodiments herein, there may be one pair of barrier walls or two pairs of barrier walls, and they may be hinged. In FIG. 12B, the barrier walls may also be slidable with the ram, as in any embodiment.

Although the invention has been described using specific terms, devices, and/or methods, such description is for illustrative purposes of the described embodiment(s) only. Changes may be made to the described embodiment(s) by those of ordinary skill in the art without departing from the scope of the present invention, which is set forth in the following claims. In addition, it should be understood that aspects of the described embodiment(s) generally may be interchanged in whole or in part. For example, the barrier walls of the barrier wall pairs could be e.g., twenty feet long (the length of a twenty foot long container and half the length of a forty foot long container) or could be shorter or longer than twenty feet, such as ten feet long. The barrier walls could be even shorter than ten feet long or even longer than forty feet or the length of the container. The barrier wall pairs could have a top over them, which would help provide some support particularly if the barrier walls are very long. While the described embodiment loads while the hopper and container are stationary, it is possible to use the invention in non-stationary loading.

In some embodiments, the container may be loaded in a single operation rather than multiple. For example, if the barrier wall pairs extend the length of a forty foot long container, the material may be loaded into the container in a single batch, and the inner lateral walls of the container will be protected by the barrier walls. In other embodiments with shorter barrier wall pairs, the container may still be loaded in a single batch.

Preferably, the number of loading steps could be as follows:

Number of loading steps equals (or is greater than) the length of the container to be loaded divided by the length of the barrier walls, the number of steps being rounded up to the nearest whole number. Therefore, if the container and barrier wall pair(s) are the same length, then the container could be loaded in one step, while the walls are protected. If the barrier wall pair(s) are one half the length of the container, then the container could be loaded in two steps (or more if desired) while the walls are protected.

In some embodiments, the barrier wall pair(s) are inserted into the container, in which case a top for the barrier wall pair(s) is preferred for rigidity, without attachment to the hopper, and then moved. The barrier walls may be attached to a fixed object other than the container or the hopper (e.g., the floor, or a support structure for the hopper).

In some embodiments, the hopper and barrier wall pairs may be movable instead of the container.

In some embodiments, the support legs may not be permanently attached to the hopper.

The invention claimed is:

1. A method for loading a container comprising:
   (a) providing a loading system comprising;
      (i) a hopper, the hopper having spaced apart side walls and a floor, the side walls and the floor having a substantially co-equal length and defining a first end and a second end of the hopper, the second end being open for communication with a container for loading material from the hopper into the container;
   a barrier wall assembly comprising;
      (ii) first and second spaced apart barrier walls defining a first barrier wall pair, each of the first and second barrier walls having a selected length and being configured to fit into the hopper with the first and second barrier walls extending lengthwise of the hopper and proximate respective side walls of the hopper;
      (iii) a ram attachable to the barrier wall pair at one or more selected points along the length of the barrier wall pair, the ram extending across the barrier wall pair and defining a load space as an area between the first barrier wall pair from the ram toward the second end of the hopper; and
      (iv) a motive force mechanism that moves the barrier wall assembly lengthwise of the hopper;
   (b) loading material, which is to be loaded into a container, into the load space;
   (c) moving the barrier wall assembly under power of the motive force mechanism so that the barrier wall pair extends beyond the second end of the hopper a selected distance into a container, the ram thereby pushing material contained in the load space from the hopper into such a container while the material remains substantially between the barrier walls; and (d) moving the barrier wall assembly back into the hopper;

whereby material contained in the load space is deposited into a container while the barrier wall pair is the selected distance inside such a container thereby to protect walls of such a container as the material is moved into such a container, wherein the selected length of the first barrier wall is different from the selected length of the second barrier wall, and in the step of moving the barrier wall assembly a selected distance into the hopper, the first barrier wall extends the selected distance into the hopper, and the second barrier wall extends less than the selected distance into the hopper.

2. The method of claim 1, wherein in the step of moving the barrier wall assembly, the barrier wall assembly is moved by moving the barrier wall assembly on a rail system disposed along the floor of the hopper with the first and second spaced apart barrier walls mounted on the rail system for moving the barrier wall assembly in a lengthwise direction with respect to the hopper.

3. The method of claim 2, wherein during the step of moving the barrier wall assembly, the rail system is extended a selected distance beyond the second end of the hopper to allow the first barrier wall pair to move partially or completely beyond the second end of the hopper into a container.

4. The method of claim 1, wherein in step of moving the barrier wall assembly back into the hopper, the motive force mechanism provides a force for pulling the barrier wall assembly back into the hopper.

5. The method of claim 1, wherein there is a step of coupling the motive force mechanism to the ram so as to push and pull the ram and thereby the barrier wall assembly.

6. The method of claim 1, further comprising a step of attaching the ram to one of the selected points along the length of the first barrier wall pair.

7. The method of claim 6, the system further comprises a mechanism that attaches the ram to the one or more selected points alongside members of the ram that are adjacent mating connecting points on the barrier walls.

8. A method for loading a container comprising:
(a) providing a loading system comprising;
 (i) a hopper, the hopper having spaced apart side walls and a floor, the side walls and the floor having a substantially co-equal length and defining a first end and a second end of the hopper, the second end being open for communication with a container for loading material from the hopper into the container;
a barrier wall assembly comprising;
 (ii) first and second spaced apart barrier walls defining a first barrier wall pair, each of the first and second barrier walls having a selected length and being configured to fit into the hopper with the first and second barrier walls extending lengthwise of the hopper and proximate respective side walls of the hopper;
 (iii) a ram attachable to the barrier wall pair at one or more selected points along the length of the barrier wall pair, the ram extending across the barrier wall pair and defining a load space as an area between the first barrier wall pair from the ram toward the second end of the hopper; and (iv) a motive force mechanism that moves the barrier wall assembly lengthwise of the hopper;
(b) loading material, which is to be loaded into a container, into the load space;
(c) moving the barrier wall assembly under power of the motive force mechanism so that the barrier wall pair extends beyond the second end of the hopper a selected distance into a container, the ram thereby pushing material contained in the load space from the hopper into such a container while the material remains substantially between the barrier walls; and
(d) moving the barrier wall assembly back into the hopper;
whereby material contained in the load space is deposited into a container while the barrier wall pair is the selected distance inside such a container thereby to protect walls of such a container as the material is moved into such a container, wherein the loading system further comprises a second barrier wall pair with barrier walls thereof hinged to respective barrier walls of the first barrier wall pair such that the barrier walls of the second barrier wall pair, and there is a step of rotating the second barrier walls to either an extended position to further extend the barrier wall assembly or to a folded position adjacent the respective barrier walls of the first barrier wall pair.

9. The method of claim 8 wherein in the step of rotating the second barrier walls they are rotated when loading a twenty foot container to the folded position providing for a combined length of the first and second barrier wall pairs of not more than twenty feet, and when loading a forty foot container the second barrier walls are rotated to the extended position where the combined length of the first and second barrier wall pairs is greater than twenty feet and no more than forty feet.

10. The method of claim 1 wherein the length of the barrier walls of the first barrier wall pair is selected either to accommodate loading into a twenty foot container or a forty foot container.

11. A method for loading a container comprising:
(a) providing a combined hopper and attached barrier wall assembly loading system comprising;
a hopper, the hopper having spaced apart side walls and a floor, the side walls and the floor having a substantially co-equal length and defining a first end and a second end of the hopper, the second end being open for communication with a container for loading material from the hopper into the container;
first and second spaced apart barrier walls each having a selected length and each barrier wall being attached to the second end of one of the side walls of the hopper and extending lengthwise beyond the second end of the hopper toward a container thereby defining a first barrier wall pair;
(a) a motive force mechanism that moves the hopper toward a container;
(b) loading material, which is to be loaded into a container, into the hopper;
(c) relatively moving the hopper with respect to a container into a position to move material from the hopper into a container and thereby moving the first barrier wall pair a selected distance into such a container;
(d) moving the material in the hopper into such a container positioned with the barrier wall pair inside it with each of the barrier walls of the barrier wall pair being proximate a wall of such a container;

whereby material contained in the hopper is deposited into such a container while the barrier wall pair is the selected distance inside such a container thereby to protect walls of such a container as the material is moved into such a container, wherein the loading system further comprises a second barrier wall pair with barrier walls thereof hinged to respective barrier walls of the first barrier wall pair such that the barrier walls of the second barrier wall pair, and there is a step of rotating the second barrier walls to either an extended position to further extend the barrier wall assembly or to a folded position adjacent the respective barrier walls of the first barrier wall pair.

12. The method of claim 11 wherein the length of the first barrier wall pair is selected to accommodate being positioned into either a twenty foot or a forty foot container being loaded to protect the side walls of such a container during loading.

13. The method of claim 11, wherein the combined length of the first and second barrier wall pairs is selected such that in the folded position a twenty foot container can be accommodated and in the extended position a forty foot container can be accommodated.

14. A method for loading a container comprising:
(a) providing a combined hopper and attached barrier wall assembly loading system comprising;
a hopper, the hopper having spaced apart side walls and a floor, the side walls and the floor having a substantially co-equal length and defining a first end and a second end of the hopper, the second end being open for communication with a container for loading material from the hopper into the container;
first and second spaced apart barrier walls each having a selected length and each barrier wall being attached to the second end of one of the side walls of the hopper and extending lengthwise beyond the second end of the hopper toward a container thereby defining a first barrier wall pair;
(a) a motive force mechanism that moves the hopper toward a container;
(b) loading material, which is to be loaded into a container, into the hopper;
(c) relatively moving the hopper with respect to a container into a position to move material from the hopper into a container and thereby moving the first barrier wall pair a selected distance into such a container;
(d) moving the material in the hopper into such a container positioned with the barrier wall pair inside it with each of the barrier walls of the barrier wall pair being proximate a wall of such a container;
whereby material contained in the hopper is deposited into such a container while the barrier wall pair is the selected distance inside such a container thereby to protect walls of such a container as the material is moved into such a container, wherein the selected length of the first barrier wall is different from the selected length of the second barrier wall, and in the step of moving the material in the hopper into such a container, the first barrier wall extends a first distance into the hopper, and the second barrier wall extends less than the first distance into the hopper.

15. A system for loading a container in a manner that will protect sides of the container from being damaged by material being loaded in it during the loading process comprising:
a loading system comprising;
a hopper, the hopper having spaced apart side walls and a floor, the side walls and the floor having a substantially co-equal length and defining a first end and a second end of the hopper, the second end being open for communication with a container for loading material from the hopper into the container;
a barrier wall assembly comprising;
first and second spaced apart barrier walls defining a first barrier wall pair, each having a selected length and being configured to fit into the hopper with the first and second barrier walls extending lengthwise of the hopper proximate respective side walls of the hopper; and
a ram attachable to the barrier wall pair at one or more selected points along the length of the barrier wall pair, the ram extending across the barrier wall pair and defining a load space as an area between the first barrier wall pair from of the ram toward the second end of the hopper; and
means for moving the barrier wall assembly so that the barrier wall pair extends beyond the second end of the hopper a selected distance into a container, the ram thereby pushing material contained in the load space from the hopper into such a container while the material remains substantially between the barrier walls and for moving the barrier wall assembly back into the hopper;
whereby material contained in the load space is deposited into a container while the barrier wall pair is the selected distance inside such a container thereby to protect walls of such a container as the material is moved into such a container,
further comprising a second barrier wall pair with barrier walls thereof hingedly connected to respective barrier walls of the first barrier wall pair such that the barrier walls of the second barrier wall pair can be rotated to either an extended position to further extend the barrier wall assembly or to a folded position adjacent the respective barrier walls of the first barrier wall pair.

16. The system of claim 15 wherein the means for moving the barrier wall assembly comprises a rail system along the floor of the hopper with the first and second spaced apart barrier walls mounted on the rail system for moving the barrier wall assembly lengthwise of the hopper.

17. The system of claim 15 wherein the means for moving the barrier wall assembly is connected to the ram so as to push and pull the ram and thereby move the barrier wall assembly.

18. The system of claim 15 wherein the combined length of the first and second barrier wall pairs is selected such that in the folded position a 20 foot container can be accommodated and in the extended position a 40 foot container can be accommodated.

19. A system for loading a container in a manner that will protect sides of the container from being damaged by material being loaded in it during the loading process comprising:
a loading system comprising;
a hopper, the hopper having spaced apart side walls and a floor, the side walls and the floor having a substantially co-equal length and defining a first end and a second end of the hopper, the second end being open for communication with a container for loading material from the hopper into the container, the hopper side walls defining a load space therein for receiving material to be loaded into a container;

a barrier wall assembly comprising first and second spaced apart barrier walls defining a first barrier wall pair, each having a selected length and being configured to fit into the hopper with the first and second barrier walls extending lengthwise of the hopper proximate respective side walls of the hopper; and a ram for moving material in the hopper in a loading direction into a container, whereby material contained in the load space is deposited into a container while the barrier wall pair is the selected distance inside such a container thereby to protect walls of such a container as the material is moved into such a container, further comprising a second barrier wall pair with barrier walls thereof hingedly connected to respective barrier walls of the first barrier wall pair such that the barrier walls of the second barrier wall pair can be rotated to either an extended position to further extend the barrier wall assembly or to a folded position adjacent the respective barrier walls of the first barrier wall pair.

20. A system for loading a container in a manner that will protect sides of the container from being damaged by material being loaded in it during the loading process comprising:

a loading system comprising;

a hopper, the hopper having spaced apart side walls and a floor, the side walls and the floor having a substantially co-equal length and defining a first end and a second end of the hopper, the second end being open for communication with a container for loading material from the hopper into the container, the hopper side walls defining a load space therein for receiving material to be loaded into a container;

a barrier wall assembly comprising first and second spaced apart barrier walls defining a first barrier wall pair, each having a selected length and being configured to fit into the hopper with the first and second barrier walls extending lengthwise of the hopper proximate respective side walls of the hopper; and a ram for moving material in the hopper in a loading direction into a container, whereby material contained in the load space is deposited into a container while the barrier wall pair is the selected distance inside such a container thereby to protect walls of such a container as the material is moved into such a container, wherein the first and second barrier walls of the first barrier wall pair are hinged to the ends of the side walls of the hopper.

21. The system of claim 20, further comprising a second barrier wall pair with barrier walls thereof hingedly connected to respective barrier walls of the first barrier wall pair such that the barrier walls of the second barrier wall pair can be rotated to either an extended position to further extend the barrier wall assembly or to a folded position adjacent the respective barrier walls of the first barrier wall pair.

* * * * *